(12) United States Patent
Ikeda

(10) Patent No.: US 7,258,215 B2
(45) Date of Patent: Aug. 21, 2007

(54) ONE-WAY CLUTCH FIXING STRUCTURE

(75) Inventor: Tetsuo Ikeda, Kashiwara (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 172 days.

(21) Appl. No.: 11/066,810

(22) Filed: Feb. 28, 2005

(65) Prior Publication Data
US 2005/0189193 A1 Sep. 1, 2005

(30) Foreign Application Priority Data
Mar. 1, 2004 (JP) .......................... P2004-056292
Mar. 1, 2004 (JP) .......................... P2004-056510

(51) Int. Cl.
*F16D 41/06* (2006.01)
(52) U.S. Cl. .................. 192/45.1; 192/110 B; 192/115
(58) Field of Classification Search .................. 192/45, 192/45.1
See application file for complete search history.

(56) References Cited

U.S. PATENT DOCUMENTS

| | | | | |
|---|---|---|---|---|
| 2,082,842 A | * | 6/1937 | Marland | ...................... 192/45 |
| 5,094,076 A | * | 3/1992 | Henricks | ...................... 60/345 |
| 5,809,808 A | * | 9/1998 | Andriano et al. | ............ 68/23.7 |
| 6,026,642 A | * | 2/2000 | Myers | .......................... 60/345 |
| 2004/0000459 A1 | * | 1/2004 | Shiraishi et al. | .............. 192/45 |

FOREIGN PATENT DOCUMENTS

| | | | |
|---|---|---|---|
| JP | 61-291112 A | * | 12/1986 |
| JP | 6-31091 | | 2/1994 |
| JP | 7-68078 | | 3/1995 |
| JP | 11-108084 | | 4/1999 |
| JP | 2001-082510 A | * | 3/2001 |

\* cited by examiner

Primary Examiner—Richard M. Lorence
(74) Attorney, Agent, or Firm—McGinn IP Law Group, PLLC (57) ABSTRACT

Holes of a predetermined depth are formed in an outer peripheral surface of an outer ring. The outer ring is integrally connected to a housing by insert molding, so that a resin, forming the housing, is received in the holes. Alternatively, pins are fixedly inserted respectively in the holes, and are fitted respectively in grooves, notches or through holes formed in the housing. With this construction, a creep is positively prevented without the need for providing an interference fit between the housing and the outer ring.

15 Claims, 10 Drawing Sheets

ONE-WAY CLUTCH FIXING STRUCTURE

BACKGROUND OF THE INVENTION

This invention relates to a structure of fixing a one-way clutch to a housing. The invention can also be applied to a so-called rolling bearing-integrated one-way clutch in which a one-way clutch and a rolling bearing have common outer or inner rings.

Generally, a one-way clutch includes a plurality of wedge elements (such as sprags or rollers), and an urging member for urging these wedge elements in a predetermined direction (locking direction). Sprags, rollers or the like are used as the wedge elements, and when the inner and outer rings rotate relative to each other, a torque is transmitted in one direction only by the interaction between the shape of the wedge elements and the shape of a space between the inner and outer rings, and the inner and outer rings idle relative to each other in the other direction. There is also known a so-called rolling bearing-integrated one-way clutch in which the outer ring and inner ring of such a one-way clutch serve also as common at least one of outer and inner rings for a rolling bearing.

In the above one-way clutch, usually, the inner ring is fixed to a shaft, while the outer ring is received within a housing, and is fixed thereto so that the torque transmission/idling is effected between the shaft and the housing. Therefore, the inner ring and the shaftd need to move in unison, while the outer ring and the housing need to move in unison. Therefore, the inner ring and the shaft are fittingly fixed to each other by interference fit, while the outer ring and the housing are fittingly fixed to each other by interference fit.

Incidentally, in the case where the housing is formed, for example, by press working, and its dimensional accuracy and shape accuracy are low, it is difficult to control the dimension of the outer diameter of the outer ring so as to fit the outer ring in the housing by the predetermined interference fit. As a technique for solving this problem, there has been proposed a one-way clutch (see, for example, Patent Literature 1) in which an eccentric groove is formed in an outer periphery of an outer ring, and a stop ring with an outwardly-projecting pressing portion, is mounted in the eccentric groove so that a so-called creep phenomenon (in which the outer ring and a housing rotate relative to each other) will not occur even when a certain degree of clearance exists between the outer ring and the housing.

Patent Literature 1: JP-A-11-108084

In the above related creep prevention technique in which the stop ring is mounted in the eccentric groove formed in the outer ring, a considerable cost is required for forming the eccentric groove in the outer ring, and besides it is difficult to completely eliminate a possibility that a slip develops between the stop ring and the outer ring and also between the stop ring and the housing with respect to the relation between the depth of the eccentric groove and the dimension of the inner diameter of a housing hole, since a resilient force of the stop ring is utilized. Therefore, it is difficult to completely solve the problem that creep develops between the outer ring and the housing.

In recent years, with the advanced study of resins, there have been developed resins having excellent mechanical strength. For example, with respect to a one-way clutch used in a drive system of a washing/dewatering basket (rotating vessel) of a washing/dewatering machine, it has been proposed to form a housing of this one-way clutch, using a resin. In the case of using such a resin-molded housing, a certain degree of effect can be expected by the use of the above related technique, but there still remains the problem that the cost for forming the eccentric groove in the outer ring increases considerably.

For fitting the outer ring of the one-way clutch in the hole in the resin-molded housing, it is advantageous to use a method in which the outer ring is integrally connected to the housing by insert molding. In the insert molding method, however, it is substantially impossible to integrally connect the outer ring to the housing by interference fit, and it is expected that there arises a problem that the creep phenomenon (in which the two rotates relative to each other) is liable to develop due for example to the difference in thermal expansion between the two.

SUMMARY OF THE INVENTION

This invention has been made in view of the foregoing, and an object of the invention is to provide a one-way clutch fixing structure in which an outer ring of a one-way clutch can be integrally connected to a housing against rotation relative thereto, and also to provide a one-way clutch fixing structure in which the housing is made of a resin.

In an exemplary embodiment of the invention, a one-way clutch fixing structure may include
  a one-way clutch having
    an inner ring,
    an outer ring having a hole of a predetermined depth formed in an outer peripheral surface thereof, a plurality of wedge elements provided between an inner peripheral surface of the outer ring and an outer peripheral surface of the inner ring, and urging members urging the wedge elements in a predetermined direction. The outer ring and the inner ring may be rotatable relative to each other so as to transmit a torque in only one direction through the wedge elements. and the structure may also include
  a housing that is made of resin and receives the outer ring.
    The outer ring is integrally connected to the housing by insert molding, and the resin is received in the hole.

In another exemplary embodiment of the invention, a one-way clutch fixing structure may include
  a one-way clutch that has
    an inner ring,
    an outer ring having a projecting member projecting outwardly from an outer peripheral surface thereof in a radial direction, a plurality of wedge elements provided between an inner peripheral surface of the outer ring and an outer peripheral surface of the inner ring, and urging members urging the wedge elements in a predetermined direction. The outer ring and the inner ring may be rotatable relative to each other so as to transmit a torque in only one direction through the wedge elements. and the structure may also include a housing that is made of resin and receives the outer ring.
  The outer ring is integrally connected to the housing by insert molding, and the projecting member is embedded in the resin.

In yet another exemplary embodiment of the invention, a rolling bearing-integrated one-way clutch fixing structure may include
  a rolling bearing-integrated one-way clutch that has
    an inner ring,
    an outer ring having a hole of a predetermined depth formed in an outer peripheral surface thereof, a plurality of rolling elements which are provided between an inner peripheral surface of the outer ring and an outer peripheral surface of the inner ring, and are disposed at a predetermined region in an axial direction, a plurality of wedge elements disposed at one side portion of the predetermined region and urging members urging the wedge elements in a predetermined direction. The outer ring and the inner ring may be rotatable relative to each other so as to transmit a torque in only one direction through the wedge elements. The structure may also include a housing which receives the outer ring, and has a groove corresponding to the hole, and a pin which is fixedly inserted in the hole, and projects from the outer peripheral surface of the outer ring. The hole is formed in a portion of the outer peripheral surface of the outer ring corresponding to the one side portion, and the pin is fitted in the groove.

In the present invention, a creep is positively prevented, and it is substantially unnecessary to control the dimension of the outer diameter of the outer ring, and therefore the control of the dimensions of the inner and outer rings so as to adjust a space therebetween can be effected quite easily, and the overall cost can be made generally equal to or lower than that of the related construction. In the case of using the resin-molded housing, the outer ring of the one-way clutch can be integrally connected to the housing by insert molding while keeping the cost to a low level. And besides, the hole is formed in that portion of the outer ring corresponding to the one-way clutch track surface, and therefore the overall strength of the rolling bearing-integrated one-way clutch (to which the invention is applied) will hardly be reduced.

DETAIL DESCRIPTION OF PREFERRED EMBODIMENTS

Figure 1:
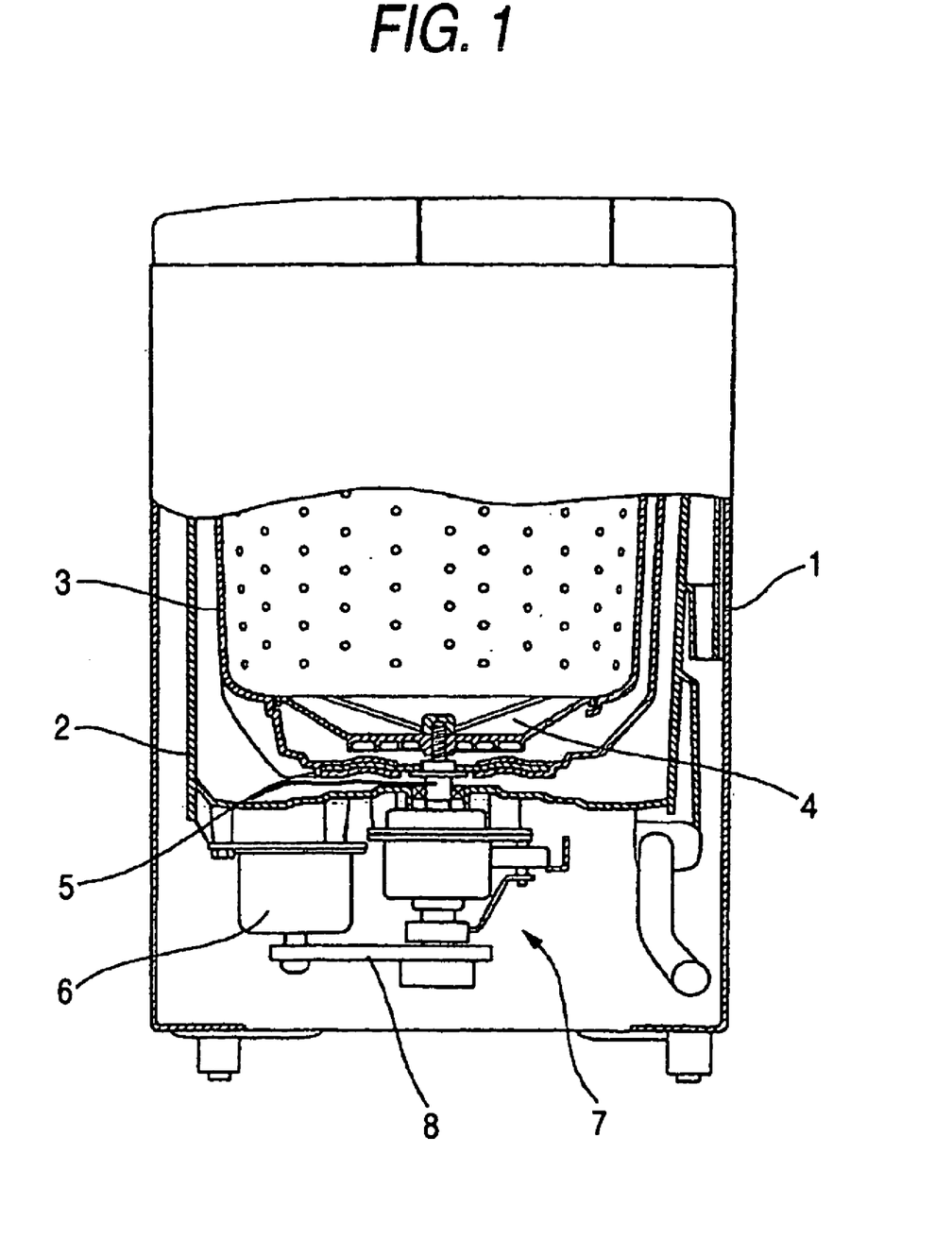
FIG. 1 is a vertical cross-sectional view showing an overall construction of a washing/dewatering machine having a drive system in which a first embodiment of the invention, applied to a rolling bearing-integrated one-way clutch, is used.
Figure 2:
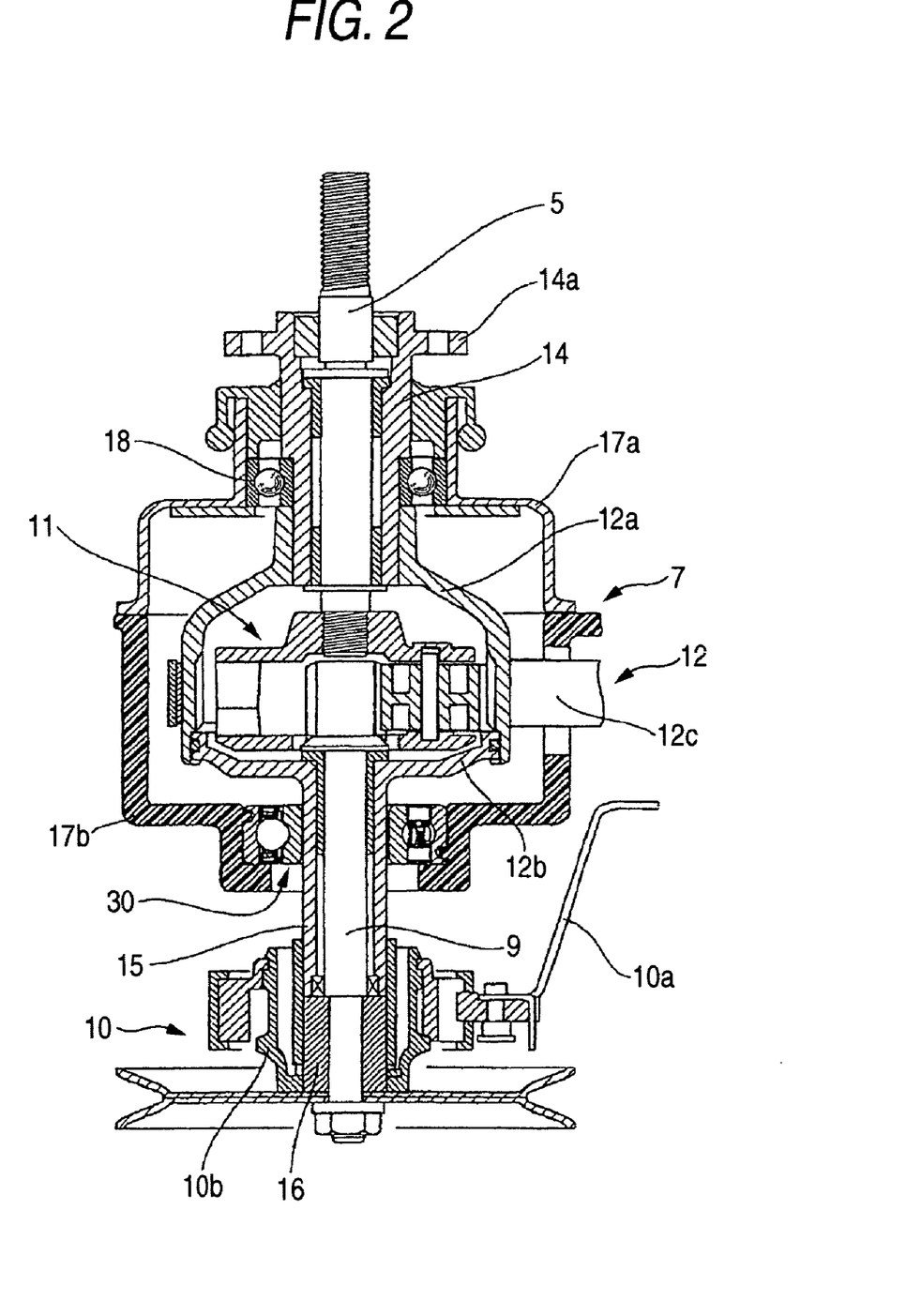
FIG. 2 is an enlarged cross-sectional view of an important portion of FIG. 1.
Figure 3:
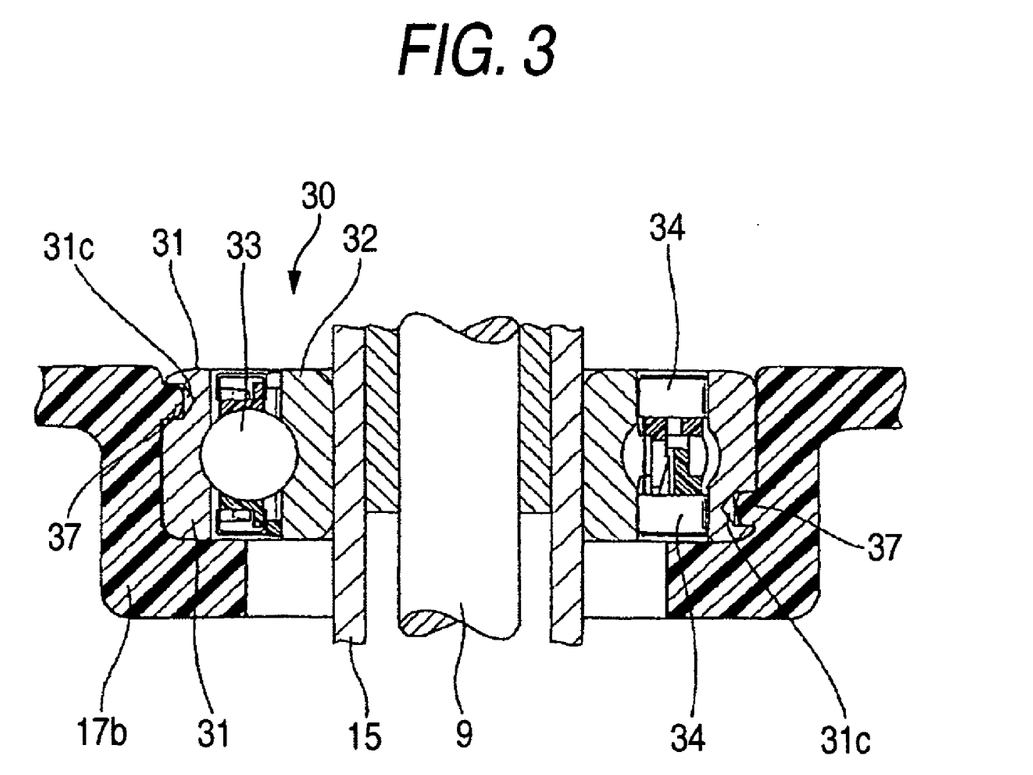
FIG. 3 is an enlarged view showing the rolling bearing-integrated one-way clutch of FIG. 2 and its vicinity.

A first embodiment of the present invention will now be described with reference to the drawings. FIG. 1 is a vertical cross-sectional view showing an overall construction of a washing/dewatering machine having a drive system in which the first embodiment of the invention, applied to a rolling bearing-integrated one-way clutch, is used. FIG. 2 is an enlarged cross-sectional view of an important portion of FIG. 1, and FIG. 3 is an enlarged view showing the rolling bearing-integrated one-way clutch of FIG. 2 and its vicinity.

First, the construction of important portions of the washing/dewatering machine will be described. In this example, a water receiving vessel 2 is swingably mounted within an outer box 1 and a rotating vessel (basket) 3 is provided within the water receiving vessel 2. An agitator 4 is provided within the rotating vessel 3, and this agitator 4 is fixedly secured to a distal end portion of an agitation shaft 5 extending through a bottom portion of the water receiving vessel 2 into the rotating vessel 3.

A motor 6 and a power control mechanism 7 are mounted below the water receiving vessel 2, and rotating power of the motor 6 is transmitted to a drive shaft 9 of the power control mechanism 7 via a belt 8. The power control mechanism 7 comprises a clutch mechanism 10, a speed reduction device 11, and a brake device 12, and the rolling bearing-integrated one-way clutch 30 (described later) is incorporated in this power control mechanism 7.

The brake device 12 comprises a brake drum 12a with an open lower end, a lid 12b closing this open lower end, a brake band 12c extended around the brake drum 12a, and a brake lever (not shown) which can be displaced by an electromagnet to impart tension to the brake band 12c to thereby brake the brake drum 12a. The brake drum 12a of the brake device 12 is fixedly connected to an upper hollow shaft 14, and the lid 12b is formed integrally with a lower hollow shaft 15. A flange 14a, formed on an upper end portion of the upper hollow shaft 14, is fixed to the rotating vessel 3. The upper hollow shaft 14, the brake drum 12a, the lid 12b and the lower hollow shaft 15 jointly form a rotating vessel shaft for imparting rotation to the rotating vessel 3.

The speed reduction device 11, comprising a planetary gear mechanism, is received within the brake drum 12a, and the above-mentioned drive shaft 9 forms an input shaft of this speed reduction device 11, The above-mentioned agitation shaft 5 forms an output shaft of the speed reduction device 11.

In the clutch mechanism 10, when a clutch lever 10a which can be displaced by the electromagnet (drive source) is kept in coupled relation to a clutch sleeve 10b, the interconnection between an interconnecting shaft 16 (rotatable together with the drive shaft 9) and the lower hollow shaft 15 is canceled, so that the rotating vessel 3 will not rotate via the rotating vessel shaft. On the other hand, when the clutch lever 10a is kept in non-coupled relation to the clutch sleeve 10b, the interconnecting shaft 16 and the lower hollow shaft 15 are interconnected, and the rotation of the drive shaft 9 is transmitted to the rotating vessel shaft, so that the rotating vessel 3 rotates in synchronism with the agitator 5.

The rotating vessel shaft, jointly formed by the upper hollow shaft 14, the lower hollow shaft 15, the brake drum 12a and the lid 12b (The two shafts 14 and 15 are interconnected by the brake drum 12a and the lid 12b), is rotatably supported on a housing 17 comprising an upper housing 17a and a lower housing 17b. In this example, the upper housing 17a is made of metal, and is pressed into a predetermined shape, while the lower housing 17b is made of a resin. The rotating vessel shaft is supported on the upper housing 17a via a rolling bearing 18, and is supported on the lower housing 17*b* by the rolling bearing-integrated one-way clutch 30.

When the lower hollow shaft 15 (and hence the rotating vessel shaft) rotates in one direction, the rolling bearing-integrated one-way clutch 30 idles to allow this rotation, and when a rotational force in the other direction acts on the one-way clutch 30, the one-way clutch 30 is locked to prevent this rotation. The direction of rotation of the rotating vessel shaft during the dewatering operation is set to the direction of idling of the rolling bearing-integrated one-way clutch 30. During the washing operation, that is, during the time when the rotating vessel shaft does not rotate, and the drive shaft 9 and the agitation shaft 5 within the rotating vessel shaft rotate in normal and reverse directions, the rotating vessel 3 receives a reaction force from its contents, and the rolling bearing-integrated one-way clutch serves to prevent the rotating vessel 3 from rotating because of this reaction force when these shafts 9 and 5 rotate in the direction of loosening of the brake band 12*c* relative to the brake drum 12*a* of the brake device 12.

Figure 4:
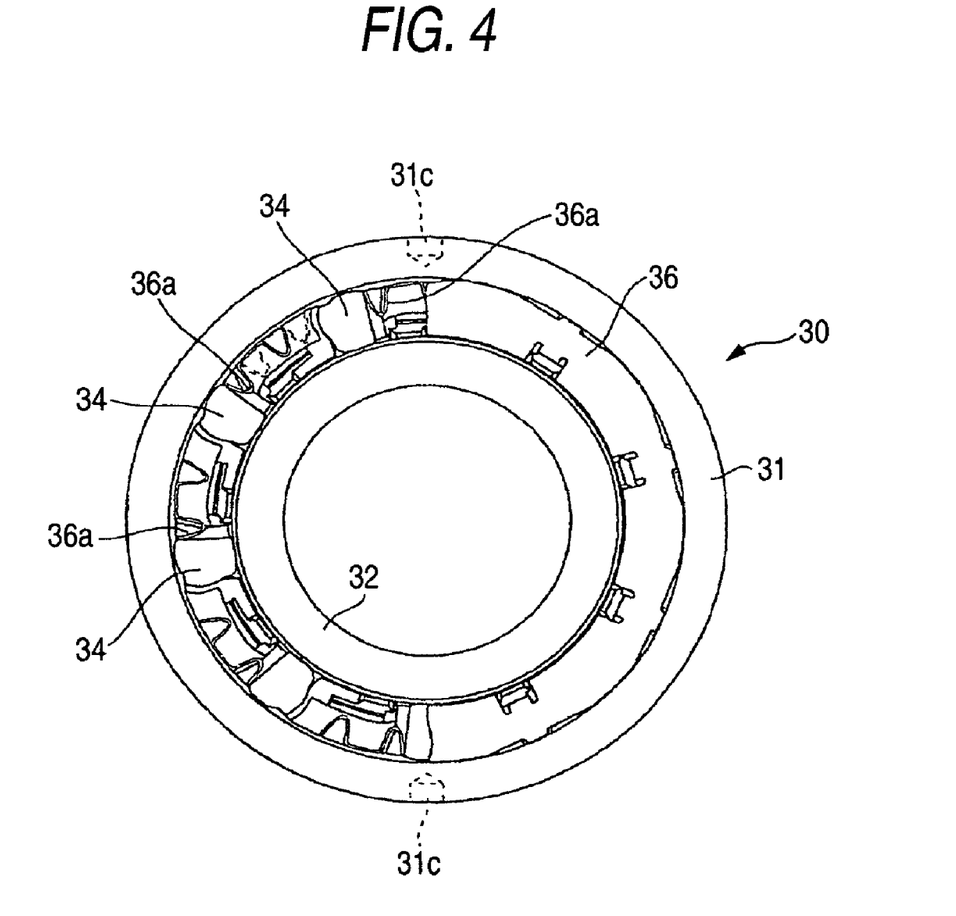
FIG. 4 is a front-elevational view of the rolling bearing-integrated one-way clutch used in the first embodiment of the invention.

The rolling bearing-integrated one-way clutch 30 is formed integrally with the resin-molded lower housing 17*b* by insert molding. As shown in FIG. 4 (which is a front-elevational view) and FIG. 5 (which is a cross-sectional view taken along the axis), the rolling bearing-integrated one-way clutch 30 has a related construction in which a plurality of balls (rolling elements) 33 are disposed in a central portion of an annular space formed between an outer ring 31 and an inner ring 32, and a plurality of sprags 34 are disposed at opposite sides of the balls 33, and the balls 33 as well as the sprags 34 are arranged at a predetermined pitch in the circumferential direction by a common retainer 35, and ring plate-like spring members 36, each having a plurality of spring piece portions 36*a* formed integrally therewith, are provided at outer sides of the sprags 34, the spring piece portions 36*a* of the spring members 36 urging the respective sprags 34 in a locking direction. Ball bearing track surfaces 31*a* and 32*a* are formed respectively at central portions of opposed peripheral surfaces of the outer and inner rings 31 and 32, and one-way clutch track surfaces 31*b* are formed respectively at opposite sides of the ball bearing track surface 31*a*, while one-way clutch track surfaces 32*b* are formed respectively at opposite sides of the ball bearing track surface 32*a*.

Figure 5:
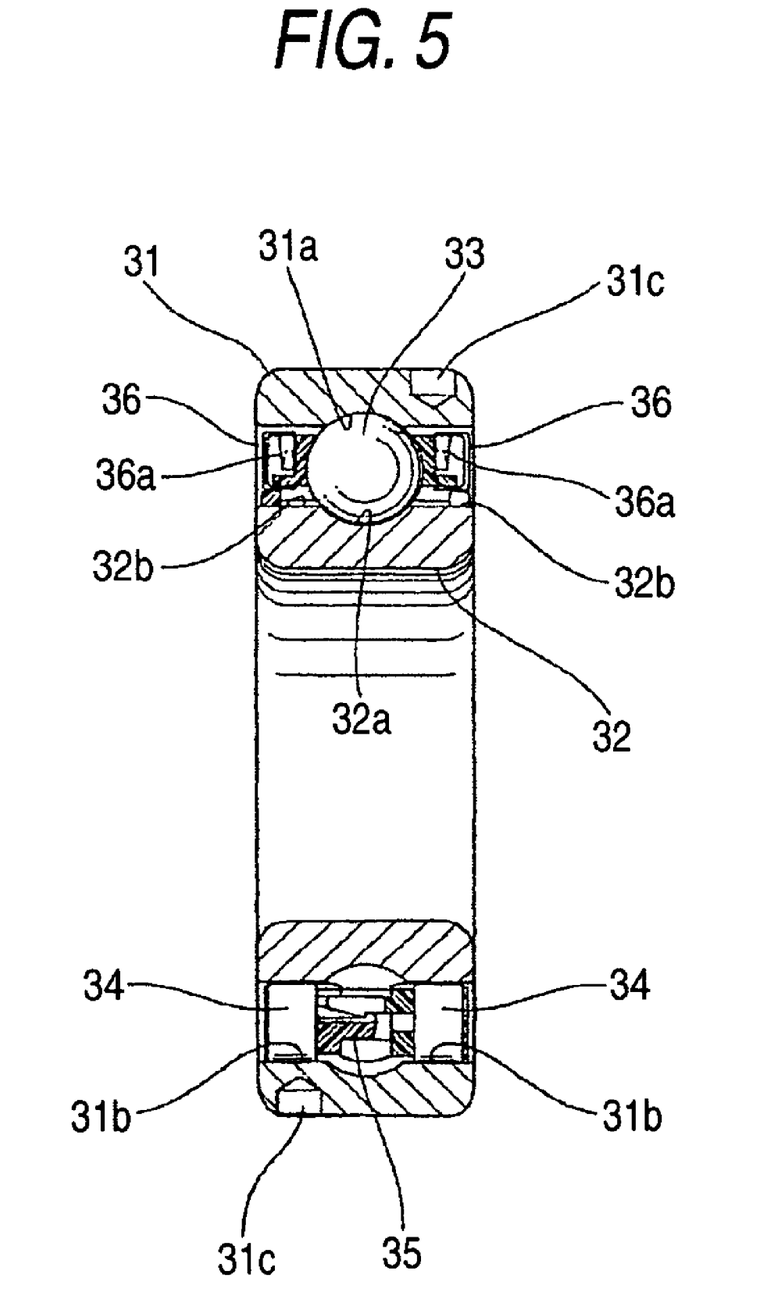
FIG. 5 is a cross-sectional view of the rolling bearing-integrated one-way clutch of FIG. 4 taken along an axis thereof.

A feature of the rolling bearing-integrated one-way clutch is that two holes 31*c*, having a predetermined depth, are formed in an outer peripheral surface of the outer ring 31, and the two holes 31*c* are spaced from each other in the direction of the circumference of the outer ring 31, and are disposed in diametrically-opposite positions, respectively. The two holes 31*c* are spaced from each other in the direction of the axis of the outer ring 31, and are disposed generally at portions corresponding to the one-way clutch track surfaces 31*b*, respectively.

The outer ring 31, having the holes 31*c*, is insert molded in the lower housing 17*b* when this lower housing 17*b* is molded. At this time, a resin for forming the lower housing 17*b* flows into the holes 31*c*, and is solidified. As a result, insertion portions 37, fully received respectively in the holes 31*c*, are formed on the lower housing 17*b* as shown in FIG. 3. Because of the existence of the insertion portions 37, the outer ring 31 and the lower housing 17*b* are integrally connected together against rotation relative to each other, and there is no fear that a creep phenomenon (in which the outer ring 31 is rotated relative to the lower housing 17*b* by a torque acting between the outer ring 31 and the inner ring 32 in the locked condition of the rolling bearing-integrated one-way clutch 30) occurs.

The rolling bearing-integrated one-way clutch 30 is integrally connected to the lower housing 17*b* when this lower housing 17 is molded, and therefore it is not necessary to prepare rolling bearing-integrated one-way clutches of various sizes so as to meet various housing sizes, and the rolling bearing-integrated one-way clutch need only to be finished into a predetermined size. Therefore, the control of a J space determined by the dimensions of the one-way clutch track surfaces of the outer and inner rings 31 and 32 can be quite easily effected, so that the overall cost can be greatly reduced.

And besides, the holes 31*c* are formed in those portions of the outer ring 31 disposed out of a portion corresponding to the bearing track surface 31*a* which is formed on a reduced-thickness portion of the outer ring 31 and on which a radial load acts. Instead, the holes 31*c* are formed in those portions of the outer ring 31 disposed generally at the portions corresponding to the one-way clutch track surfaces 31*b*, respectively. Therefore, there is not encountered a problem that the strength is reduced by the concentration of stresses and other factors.

In this first embodiment described above, the holes 31*c* are formed in the outer ring 31, and the resin flows into the holes 31*c* during the insert molding. Instead of this method, there can be used a method (shown in FIG. 6) in which pins 31*d* are inserted respectively in holes 31*c* formed in the outer ring 31, and the outer ring 31, having the pins 31*d* inserted in the respective holes 31*c*, is integrally connected to the lower housing 17*b* by insert molding when this lower housing 17*b* is molded, so that the pins 31*d* are embedded in the resin. With this method, similar effects as described above can be achieved. In this case, when the pins 31*d* of a hollow construction are used as in the illustrated example, the resin intrudes into the interior of each pin 31*d*, and therefore the relative rotation can be prevented even when a large torque is applied.

Figure 6:
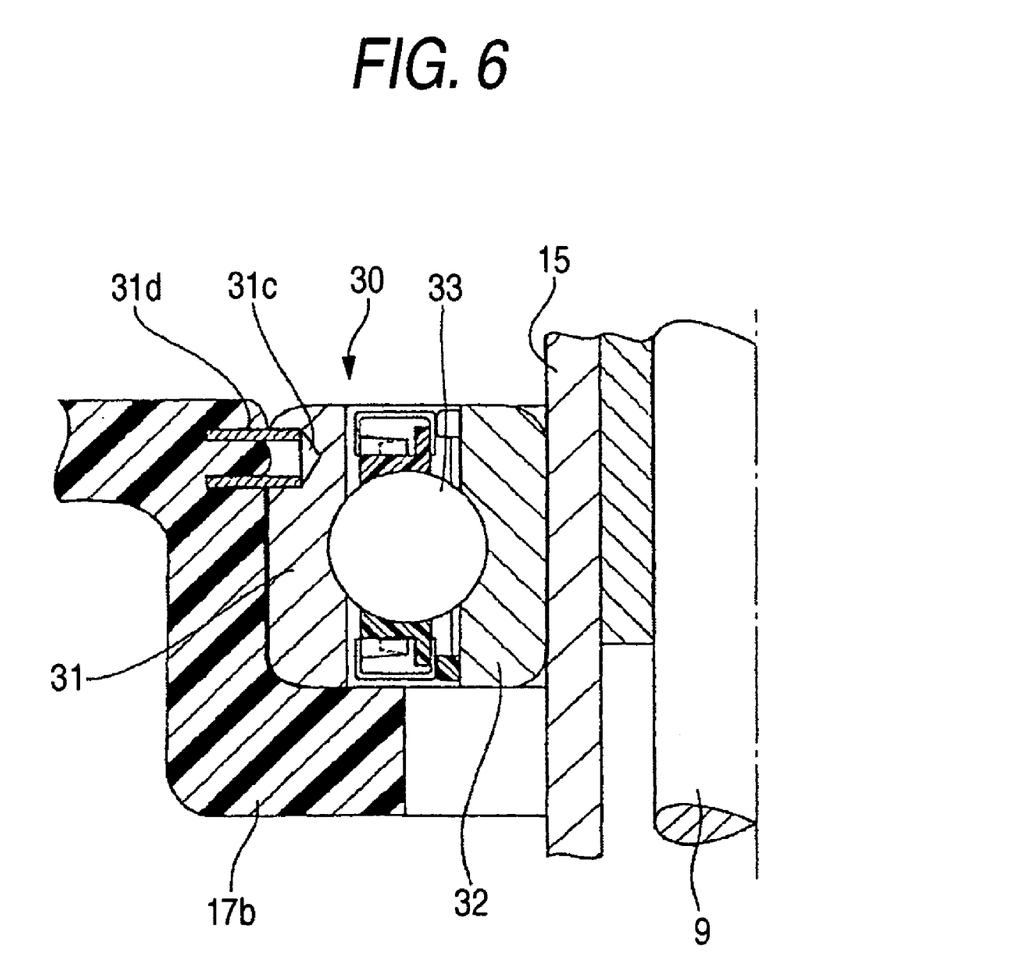
FIG. 6 is a cross-sectional view of an important portion of a modified example of the first embodiment in which hollow pins are used.

In the above first embodiment, although the two holes 31*c* or the two pins 31*d* are provided at the outer ring 31, one or more than two holes 31*c* or pins 31*d* can be provided. The number of the holes 31*c* or pins 31*d* is suitably determined in accordance with the magnitude of the expected torque, the size of the holes 31*c* or pins 31*d*, the mechanical strength of the resin to be used, etc.

Although the above first embodiment is applied to the rolling bearing-integrated one-way clutch in which at least one of outer and inner rings of a one-way clutch and a rolling bearing is common, the invention can also be applied to a one-way clutch having no rolling bearing. The rolling elements are not limited to the balls, and any other suitable rolling elements such as rollers can be used. In the above first embodiment, although the rolling elements are provided at the axially-central portion of the outer ring while the wedge elements are provided at the opposite sides of the rolling elements, the rolling elements can be provided at a predetermined portion of the outer ring other than the central portion thereof. The wedge elements do not always need to be provided at the opposite sides of the rolling elements, but can be provided only at one side of the rolling elements.

Figure 7:
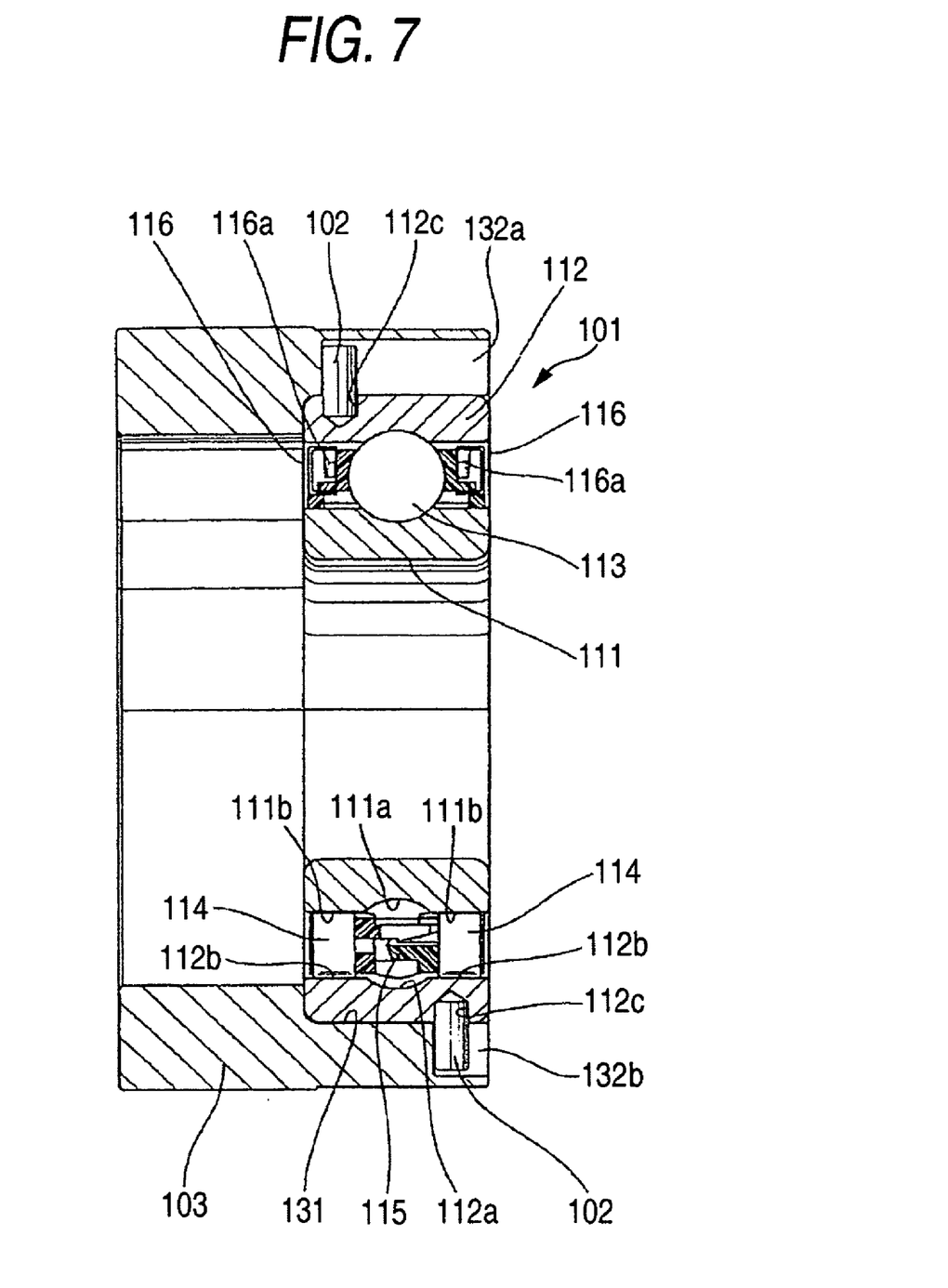
FIG. 7 is a cross-sectional view of a second embodiment of the invention taken along an axis.
Figure 8:
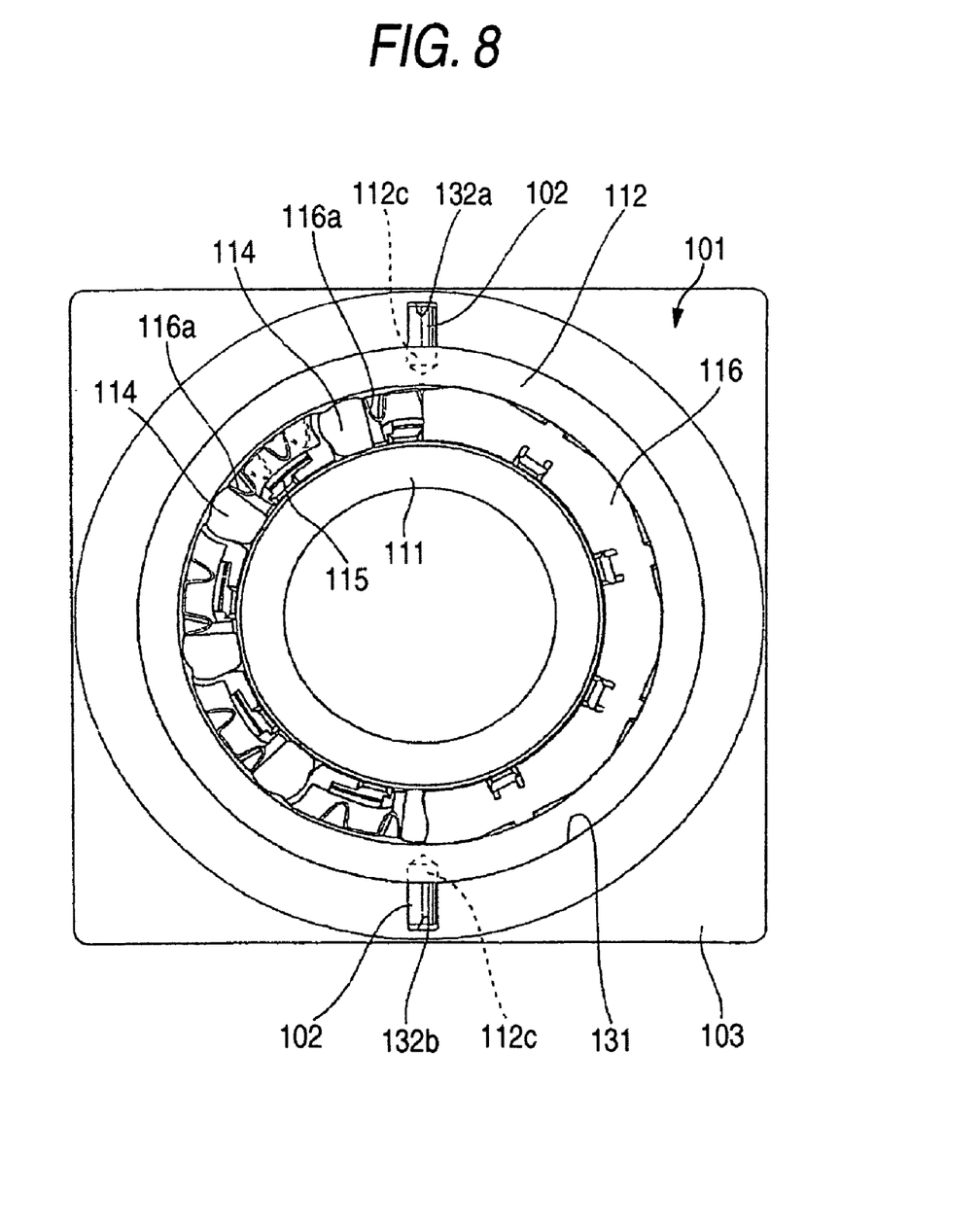
FIG. 8 is a side-elevational view of the second embodiment of FIG. 7.

Nest, a second embodiment of the invention will be described below. FIG. 7 is a cross-sectional view of the second embodiment of the invention taken along an axis, and FIG. 8 is a right side-elevational view thereof.

A rolling bearing-integrated one-way clutch 101 has such a construction that a plurality of rolling elements (balls) 113 and a plurality of sprags 114 are provided between an inner ring 111 and an outer ring 112. In this example, two circles of sprags 114 are arranged respectively at axially-opposite sides of a circle of balls 113.

The inner ring 111 has one-way clutch track surfaces 111b formed respectively at axially-opposite sides of a rolling bearing track surface 111a of the inner ring 111. The outer ring 112 also has one-way clutch track surfaces 112b formed respectively at axially-opposite sides of a rolling bearing track surface 112a of the outer ring 112. The sprags 114 as well as the balls 113 are arranged at a predetermined pitch in the circumferential direction by a common retainer 115. Spring members 116 (each in the form of an annular disk member) are fixed to axially-opposite sides of the retainer 115, respectively, and each of the spring members 116 has spring piece portions 116a (corresponding to the sprags 114) formed integrally therewith, the spring piece portions 116a of the spring members 116 urging the respective sprags 34 in a locking direction.

Two holes 112c are formed in an outer peripheral surface of the outer ring 112. The two holes 112c are disposed generally at portions corresponding to the one-way clutch track surfaces 112b, respectively, and the two holes 112c are spaced from each other in the direction of the circumference of the outer ring 112, and are disposed in diametrically-opposite positions, respectively. Pins 102 are inserted respectively in the holes 112c, and are fixed to these holes 112c, respectively. Distal end portions of the pins 102 project outwardly from the outer peripheral surface of the outer ring 112. The fixing of the pins 102 to the outer ring can be effected, for example by drive fit, press-fit, shrinkage fit, adhesive bonding or others.

The rolling bearing-integrated one-way clutch 101 is fitted in a fitting hole 131 formed in a housing 103. Grooves 132a and 132b are formed in an inner peripheral surface of the fitting hole 131 in the housing 103, and are disposed in diametrically-opposite positions, respectively. The pins 102, fixed to the outer ring 112, are fitted in the grooves 132a and 132b, respectively. A width of each of the grooves 132a and 132b is generally equal to the diameter of the pin 102.

In this second embodiment of the invention, even if the outer diameter of the outer ring 112 and the inner diameter of the fitting hole 131 in the housing 103 are so determined that the outer ring 112 is suitably loosely fitted in the fitting hole 131, the outer ring 112 and the housing 131 will not rotate relative to each other, thereby positively preventing a creep from occurring, since the pins 102, fixed to the outer ring 112, are fitted respectively in the grooves 132a and 132b formed in the inner peripheral surface of the fitting hole 131. And besides, the holes 112c through which the pins 102 are fixed to the outer ring 112 are disposed at the portion corresponding to the one-way clutch track surfaces 112b, respectively. Therefore, the provision of the holes 112c will not adversely affect the strength of a reduced-thickness portion of the outer ring 112 at which the bearing track surface 112a is formed and on which a radial load always acts. Therefore, the overall strength of the rolling bearing-integrated one-way clutch 101 will not be reduced.

Furthermore, it is substantially unnecessary to control the dimensions (that is, the outer diameter of the outer ring 112 and the inner diameter of the fitting hole 131 in the housing 103) so as to fit the outer ring 112 in the fitting hole 131, and it is only necessary to effect dimensional control of a space determined by the dimensions of the one-way clutch track surfaces 111b of the inner ring 111 and the dimensions of the one-way clutch track surfaces 112b of the outer ring 112. As a result, the operation for the dimension control is greatly simplified, and this cancels out the additional costs required for forming the holes 112c in the outer ring 112 and for forming the grooves 132a and 132b in the housing 103.

In the above second embodiment, although the pins 102, fixed to the outer ring 112, are fitted respectively in the grooves 132a and 132b formed in the housing 103, these grooves can be replaced by notches, through holes or the like.

Figure 9:
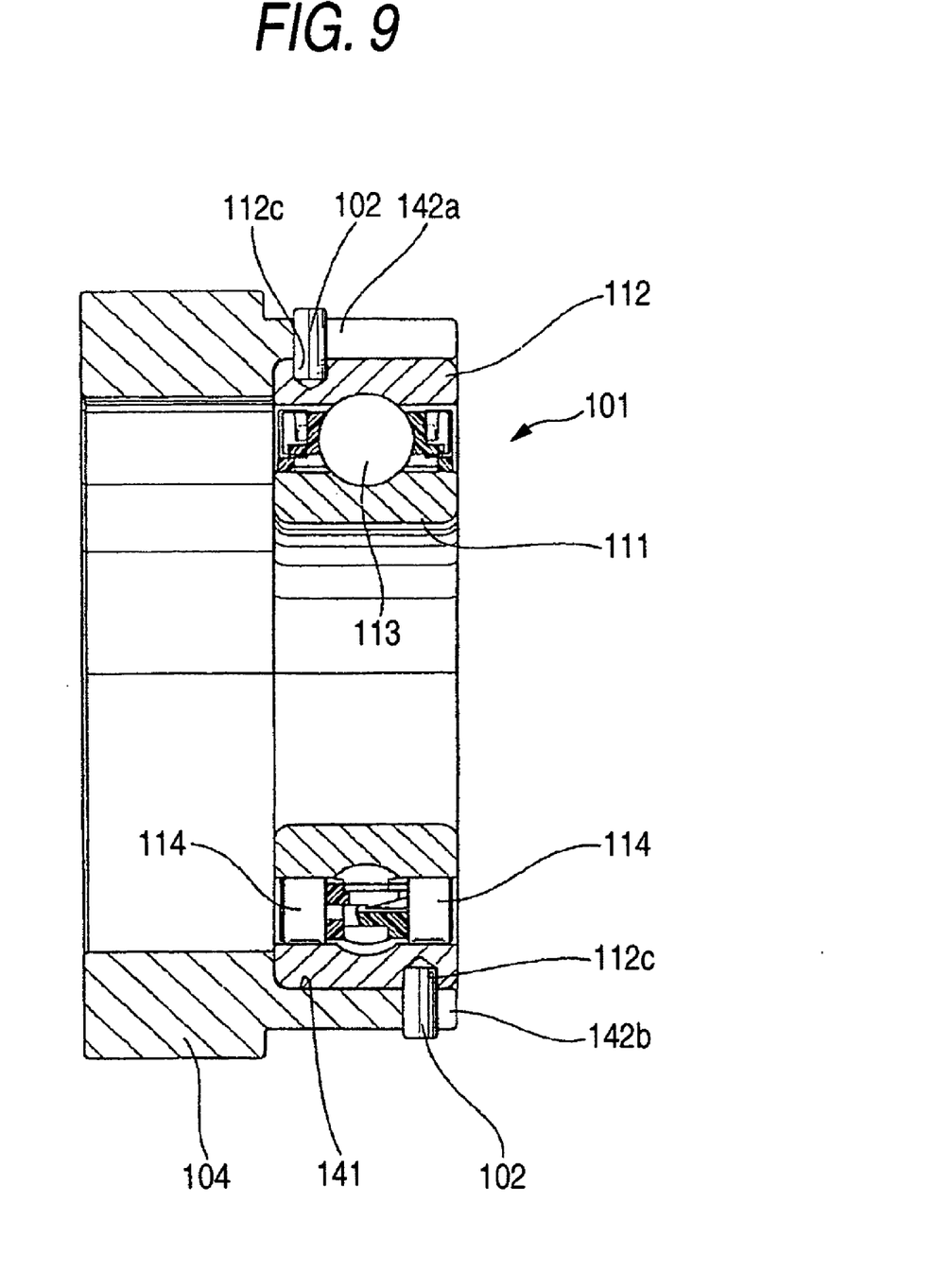
FIG. 9 is a cross-sectional view of a modified example of the second embodiment taken along an axis, in which notches are used.

In a modified example shown in FIG. 9 (which is a cross-sectional view taken along an axis), the same rolling bearing-integrated one-way clutch 101 as described in the second embodiment is used, and notches 142a and 142b, corresponding respectively to the pins 102 fixed to the outer ring 112, are formed in a fitting hole portion 141 of a housing 104 for fittingly receiving the rolling bearing-integrated one-way clutch 101. This construction in which the notches 142a and 142b are formed is suited particularly for a press-shaped product.

Figure 10:
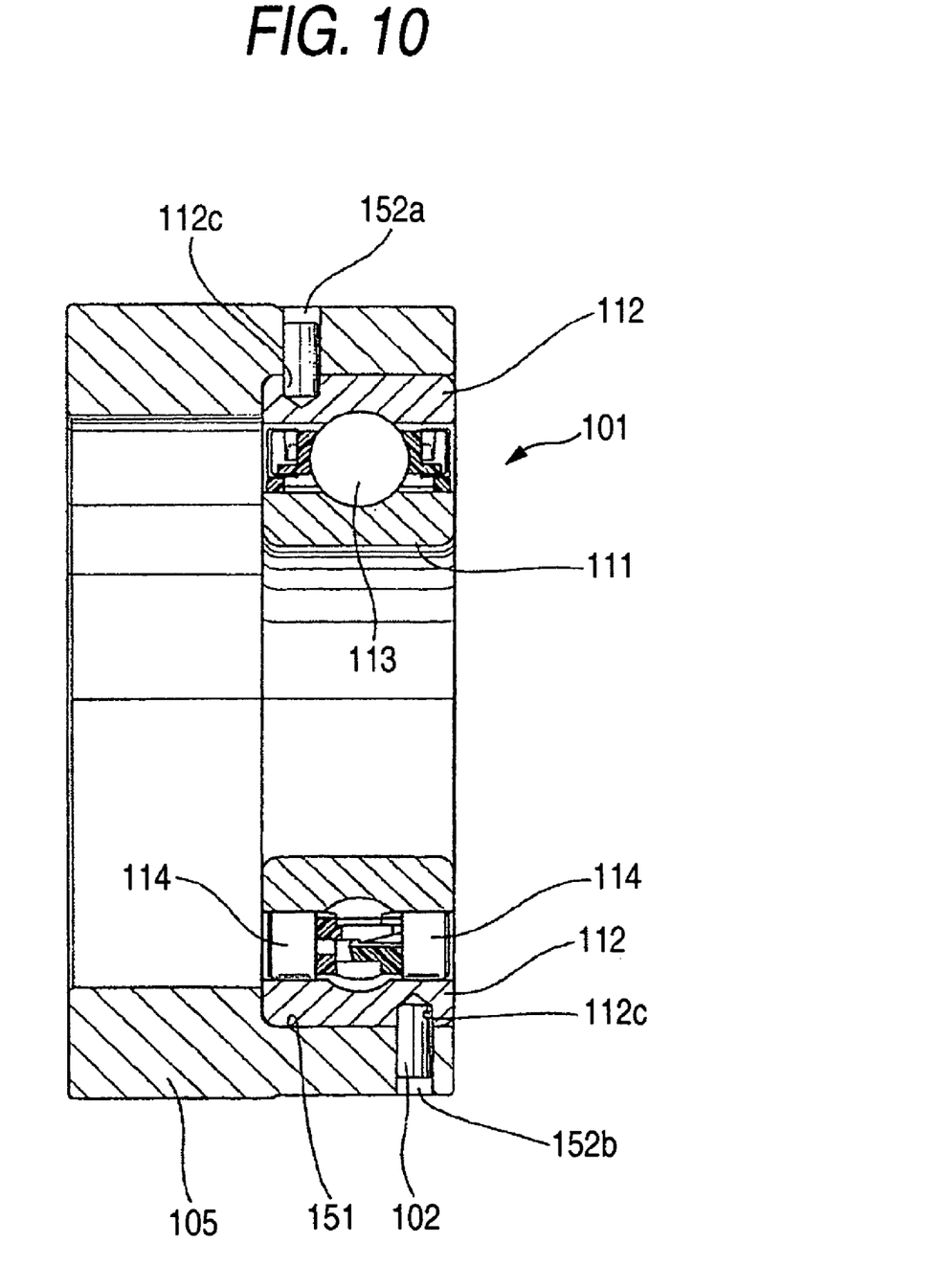
FIG. 10 is a cross-sectional view of another modified example of the second embodiment taken along an axis, in which through holes are used.

In another modified example shown in FIG. 10 (which is a cross-sectional view taken along an axis), the same rolling bearing-integrated one-way clutch 101 as described in the second embodiment is used, and through holes 152a and 152b (spaced from each other in the circumferential direction), corresponding respectively to the pins 102 fixed to the outer ring 112, are formed in a fitting hole portion 151 of a housing 105. In this example of FIG. 10, rolling bearing-integrated one-way clutch 101 is fitted into the fitting hole 151 in the housing 105, with the pins 102 not yet inserted in the respective holes 112c in the outer ring 112. Then, the holes 112c are aligned with the through holes 152a and 152b, respectively, and then each pin 102 is driven or inserted into the aligned through hole 152a (or 152b) and hole 112c, thus assembling the structure.

In the above second embodiment and modified examples, the two pins 102, as well as the two grooves 132a and 132b, the notches 142a and 142b or the two through holes 152a and 152b, are provided, the invention is not limited to such construction, and one or more than two pins 102 and one or more than two grooves 132, notches 142 or through holes 152 can be provided.

In the above embodiments, the invention is applied to the type of rolling bearing-integrated one-way clutch provided with the inner ring in which the rolling bearing inner ring track surface and the one-way clutch inner ring track surfaces are juxtaposed in the axial direction, that is, the rolling bearing inner ring and the one-way clutch inner ring are formed in an integral manner by the common member. However, with respect to the inner ring, the rolling bearing inner ring and the one-way clutch inner ring can be separate from each other. The invention can also be applied to the type of rolling bearing-integrated one-way clutch in which one or both of a rolling bear inner ring track surface and one-way clutch inner ring track surfaces are formed directly on an outer peripheral surface of a rotation shaft. Moreover, the invention can also be applied to a rolling bearing-integrated one-way clutch in which at least one of outer and inner rings of a one-way clutch and a rolling bearing is common.

What is claimed is:

1. A one-way clutch fixing structure comprising:
   a one-way clutch comprising:
      an inner ring;
      an outer ring having a hole of a predetermined depth formed in an outer peripheral surface thereof;
   a plurality of wedge elements provided between an inner peripheral surface of the outer ring and an outer peripheral surface of the inner ring; and urging members urging the wedge elements in a predetermined direction, wherein the outer ring and the inner ring being rotatable relative to each other so as to transmit a torque in only one direction through the wedge elements; and a housing that is made of resin and receives the outer ring, wherein the outer ring is integrally connected to the housing by insert molding, and the resin is received in the hole.

2. The fixing structure according to claim 1 further comprising:

a plurality of rolling elements which are provided between the inner peripheral surface of the outer ring and the outer peripheral surface of the inner ring, and are disposed at a predetermined region in an axial direction, wherein the wedge elements are disposed at one side portion of the predetermined region, and the hole is formed in a portion of the outer peripheral surface of the outer ring corresponding to the one side portion.

3. The fixing structure according to claim 1, wherein a plurality of the holes are formed in the outer peripheral surface of the outer ring in a circumferential direction.

4. A one-way clutch fixing structure comprising:

a one-way clutch comprising:
an inner ring;
an outer ring;
at least one projecting member projecting outwardly from an outermost peripheral surface the outer ring in a radial direction;
a plurality of wedge elements provided between an inner peripheral surface of the outer ring and an outer peripheral surface of the inner ring; and
urging members urging the wedge elements in a predetermined direction, wherein the outer ring and the inner ring are rotatable relative to each other so as to transmit a torque in only one direction through the wedge elements; and
a housing that is made of resin and receives the outer ring, wherein the outer ring is integrally connected to the housing by insert molding, and the at least one projecting member is embedded in the resin.

5. The fixing structure according to claim 4 further comprising:

a plurality of rolling elements which are provided between the inner peripheral surface of the outer ring and the outer peripheral surface of the inner ring, and are disposed at a predetermined region in an axial direction, wherein the wedge elements are disposed at one side portion of the predetermined region, and the at least one projecting member is formed in a portion of the outermost peripheral surface of the outer ring corresponding to the one side portion.

6. The fixing structure according to claim 4, wherein the at least one projecting member is a hollow pin, and the resin is received in the pin.

7. The fixing structure according to claim 4, wherein a plurality of projecting members are provided at the outermost peripheral surface of the outer ring in a circumferential direction.

8. The fixing structure according to claim 7, wherein the plurality of projecting members are disposed at diametrically opposite positions on an outermost peripheral surface of the outer ring.

9. The fixing structure according to claim 4, wherein the wedge elements comprise sprags.

10. The fixing structure according to claim 9, wherein the sprags are disposed at opposite sides of the rolling elements.

11. The fixing structure according to claim 4, further comprising rolling elements disposed between the inner ring and the outer ring.

12. A rolling bearing-integrated one-way clutch fixing structure comprising:

a rolling bearing-integrated one-way clutch comprising:
an inner ring;
an outer ring having a pin hole of a predetermined depth formed in an outer peripheral surface thereof;
a plurality of rolling elements which are provided between an inner peripheral surface of the outer ring and an outer peripheral surface of the inner ring, and are disposed at a predetermined region in an axial direction;
a plurality of wedge elements disposed at one side portion of the predetermined region; and
urging members urging the wedge elements in a predetermined direction,
wherein the outer ring and the inner ring are rotatable relative to each other so as to transmit a torque in only one direction through the wedge elements;
a housing made of resin which receives the outer ring, and has a fitting hole corresponding to the pin hole, the housing being integrally connected to the outer ring by insert molding; and
a pin which is fixedly inserted in the pin hole, and projects from the outer peripheral surface of the outer ring,
wherein the pin hole is formed in a portion of the outer peripheral surface of the outer ring corresponding to the one side portion, and the pin is fitted in the fitting hole.

13. The fixing structure according to claim 12,
wherein a plurality of pin holes are formed in the outer peripheral surface of the outer ring in a circumferential direction, and a plurality of the fitting holes, corresponding respectively to the plurality of pin holes, are formed in the housing, and
wherein a plurality of the pins are fixedly inserted respectively in the plurality of pin holes, and are fitted respectively in the plurality of fitting holes.

14. The fixing structure according to claim 12, wherein the fitting hole comprises a notch.

15. The fixing structure according to claim 12, wherein the fitting hole comprises a through hole.

* * * * *